United States Patent
Qiao et al.

(10) Patent No.: US 12,491,922 B1
(45) Date of Patent: Dec. 9, 2025

(54) DOUBLE-DECK TRAILER WITH A FRAMELESS TOP

(71) Applicant: Wuyi Shanqiu Leisure Products Co., Ltd., Jinhua (CN)

(72) Inventors: Chenfei Qiao, Jinhua (CN); Jianqiu Hu, Jinhua (CN)

(73) Assignee: Wuyi Shanqiu Leisure Products Co., Ltd., Jinhua (CN)

( * ) Notice: Subject to any disclaimer, the term of this patent is extended or adjusted under 35 U.S.C. 154(b) by 0 days.

(21) Appl. No.: 19/241,214

(22) Filed: Jun. 17, 2025

(30) Foreign Application Priority Data

May 7, 2025 (CN) .......................... 202520878065.X

(51) Int. Cl.
  *B62B 3/02* (2006.01)
  *B62B 3/00* (2006.01)

(52) U.S. Cl.
  CPC .............. *B62B 3/007* (2013.01); *B62B 3/025* (2013.01); *B62B 2205/06* (2013.01); *B62B 2205/33* (2013.01)

(58) Field of Classification Search
  CPC ...... B62B 3/007; B62B 3/025; B62B 2205/06
  See application file for complete search history.

(56) References Cited

U.S. PATENT DOCUMENTS

| | | | | |
|---|---|---|---|---|
| 9,738,298 B1* | 8/2017 | Yang | ......................... | B62B 3/025 |
| 10,081,380 B2* | 9/2018 | Fitzwater | ................ | B62B 3/007 |
| 10,435,055 B1* | 10/2019 | Zhu | ......................... | B62B 3/007 |
| 11,293,197 B2* | 4/2022 | Goldszer | ................. | E04H 15/46 |
| 11,332,178 B2* | 5/2022 | Yang | ......................... | B62B 5/067 |
| 11,370,467 B1* | 6/2022 | Horowitz | ................ | B62B 3/007 |
| 11,608,098 B1* | 3/2023 | Horowitz | ................ | B62B 3/004 |
| 12,304,544 B2* | 5/2025 | Conn | ....................... | B62B 5/067 |
| 2018/0327011 A1* | 11/2018 | Horowitz | ................ | B62B 3/025 |
| 2020/0070865 A1* | 3/2020 | Lavi | ......................... | B62B 3/106 |
| 2021/0300449 A1* | 9/2021 | Yang | ......................... | B62B 3/025 |
| 2023/0249730 A1* | 8/2023 | Tong | ......................... | B62B 3/022 |
| | | | | 280/651 |
| 2023/0406384 A1* | 12/2023 | Sun | ........................... | B62B 3/02 |
| 2024/0124040 A1* | 4/2024 | Conn | ...................... | B62B 5/067 |

(Continued)

FOREIGN PATENT DOCUMENTS

JP 3247679 U * 7/2024 ............. B62B 5/067

OTHER PUBLICATIONS

Translation of JP-3247679-U (Year: 2024).*

*Primary Examiner* — Katy M Ebner
(74) *Attorney, Agent, or Firm* — Birchwood IP

(57) ABSTRACT

A double-deck trailer with a frameless top includes two front vertical rods and two rear vertical rods respectively; each of the front vertical rods and the rear vertical rods is sequentially fixed with a top fixing piece and a middle fixing piece from top to bottom; a rectangular area is formed between four top fixing pieces and the middle fixing pieces, and a cloth pocket is arranged in the area; the cloth pocket includes side pockets and a front pocket; the side pockets are respectively located between two adjacent front vertical rods and two adjacent rear vertical rods, and the front pocket is located between the front vertical rods and the rear vertical rods; zippers are respectively arranged on both sides of the front pocket; after zippers are pulled down, the front pocket naturally hangs down, and items can pass between front vertical rods and rear vertical rods.

7 Claims, 5 Drawing Sheets

(56) References Cited

U.S. PATENT DOCUMENTS

| | | | | |
|---|---|---|---|---|
| 2024/0300561 A1* | 9/2024 | Zhang | ................... | B62B 3/002 |
| 2024/0336290 A1* | 10/2024 | Sun | ...................... | B62B 3/007 |
| 2024/0409141 A1* | 12/2024 | Zhu | ...................... | B62B 3/002 |
| 2025/0018989 A1* | 1/2025 | Zhang | ................... | B62B 3/002 |

* cited by examiner

DOUBLE-DECK TRAILER WITH A FRAMELESS TOP

CROSS-REFERENCE TO RELATED APPLICATIONS

This application claims priority to Chinese Patent Application No. 202520878065.X, filed on May 7, 2025, which is hereby incorporated by reference in its entirety.

TECHNICAL FIELD

The invention belongs to the technical field of outdoor trailers, specifically relates to a double-deck trailer with a frameless top.

BACKGROUND

A trailer is a handling vehicle pushed or pulled by human power. Although the technology for material handling by trailers has been continuously developing, trailers still remain as indispensable handling tools and are widely used in production and daily life. This is because they are low in cost, simple to maintain, easy to operate, light in self-weight, capable of working in places where motor vehicles are inconvenient to use, and very convenient for short-distance handling of light items.

To increase the carrying space of trailers, double-deck trailers (upper and lower decks) currently exist on the market. Both the upper and lower decks are provided with several folding rods required for folding and storage, so the storage part at the top is limited by the surrounding folding rods, making it impossible to transport over-wide items.

The technical problem to be solved by this application is: how to make the space of an upper deck of the double-deck trailer openable when transporting over-length items.

SUMMARY

In order to overcome the deficiencies of the prior art, the object of the invention is to provide a trailer with a double-deck accommodating space, in which the upper deck space can be opened to transport over-wide items.

The technical solution adopted by the invention is: a double-deck trailer with a frameless top, including two front vertical rods and two rear vertical rods respectively; each of the front vertical rods and the rear vertical rods is sequentially fixed with a top fixing piece and a middle fixing piece from top to bottom; a rectangular area is formed between four top fixing pieces and the middle fixing pieces, and a cloth pocket is arranged in the area; the cloth pocket includes side pockets and a front pocket; the side pockets are respectively located between two adjacent front vertical rods and two adjacent rear vertical rods, and the front pocket is located between the front vertical rods and the rear vertical rods; zippers are respectively arranged on both sides of the front pocket; after the zippers are pulled down, the front pocket naturally hangs down, and items can pass between the front vertical rods and the rear vertical rods.

A rectangular support frame is formed by the top fixing pieces and the middle fixing pieces arranged on the front vertical rods and the rear vertical rods for loading the cloth pocket; when the zippers are in a fastened state, the side pockets and the front pocket form a closed space with four sides, which is used for placing items with small volume and large quantity; when the zippers are in an opened state, the front pocket naturally hangs down to form an obstacle-free passage, allowing over-wide items to freely pass through and be placed between the front vertical rods and the rear vertical rods.

In some embodiments, the middle fixing piece is provided with a first bottom rod rotatably connected thereto; four first bottom rods are distributed in an X shape, and a first bottom connecting piece rotatably connected thereto is arranged at an intersection of the first bottom rods; a bottom of the cloth pocket is erected above the first bottom rod.

In some embodiments, bottoms of the front vertical rod and the rear vertical rod are fixed with bottom fixing pieces; each bottom fixing piece is provided with a second bottom rod rotatably connected thereto; four second bottom rods are distributed in an X shape, and a second bottom connecting piece rotatably connected thereto is arranged at an intersection of the second bottom rods.

In some embodiments, the front vertical rods and the rear vertical rods are provided with sliding pieces slidably connected thereto; each sliding piece is located between the middle fixing piece and the bottom fixing piece; a left-right folding rod group is arranged between the front vertical rod and the rear vertical rod, and both ends of the left-right folding rod group are respectively rotatably connected with the middle fixing piece and the sliding piece.

In some embodiments, the left-right folding rod group is composed of two symmetrically distributed left-right folding rods intersecting; one of the left-right folding rods is in an M shape and connected between two sliding pieces, and the other left-right folding rod is in a W shape and connected between the two middle fixing pieces; when folding, the M-shaped left-right folding rod pushes the sliding piece to slide downward, driving the W-shaped left-right folding rod to contract toward a center, and the left-right folding rod group automatically folds, reducing the lateral occupied space.

In some embodiments, a front-rear folding rod group is arranged between adjacent front vertical rods and the adjacent rear vertical rods, and both ends of the front-rear folding rod group are respectively rotatably connected with the top fixing piece and the sliding piece.

In some embodiments, the front-rear folding rod group is composed of two symmetrically distributed front-rear folding rods intersecting; one of the front-rear folding rods is in a V shape and connected between two top fixing pieces, and the other front-rear folding rod is in an inverted V shape and connected between two sliding pieces; the V-shaped front-rear folding rod and the inverted V-shaped front-rear folding rod intersect to form a symmetric structure; when folding, two front-rear folding rods synchronously rotate around the rotation connection point to achieve compact folding in the front-rear direction.

In some embodiments, the bottom fixing piece is provided with a bottom rod rotatably matched therewith; the bottom rod is provided with a buckle piece slidably connected therewith and detachably connected with the rear vertical rod; an extension folding rod group is arranged between two bottom rods.

In some embodiments, the extension folding rod group is composed of two symmetrically distributed extension folding rods; one of the extension folding rods is in a V shape and connected to tops of two bottom rods, and the other extension folding rod is in an inverted V shape and connected between two buckle pieces; through the detachable connection between the buckle piece and the rear vertical rod, the quick locking or releasing of the bottom rod is realized, which adapts to the requirements of different unfolding lengths and is convenient for folding and storage.

The beneficial effects of the invention are: by replacing the top fixing rod with an openable and closable cloth pocket, the restriction of the rigid structure around the upper deck of the trailer is eliminated, and the transportation demand for over-wide items is realized. Through the operation of the zipper, the front pocket can be quickly converted between the carrying mode for items with small volume and large quantity and the carrying mode for over-wide items, adapting to the needs of different scenarios.

Figure 1:
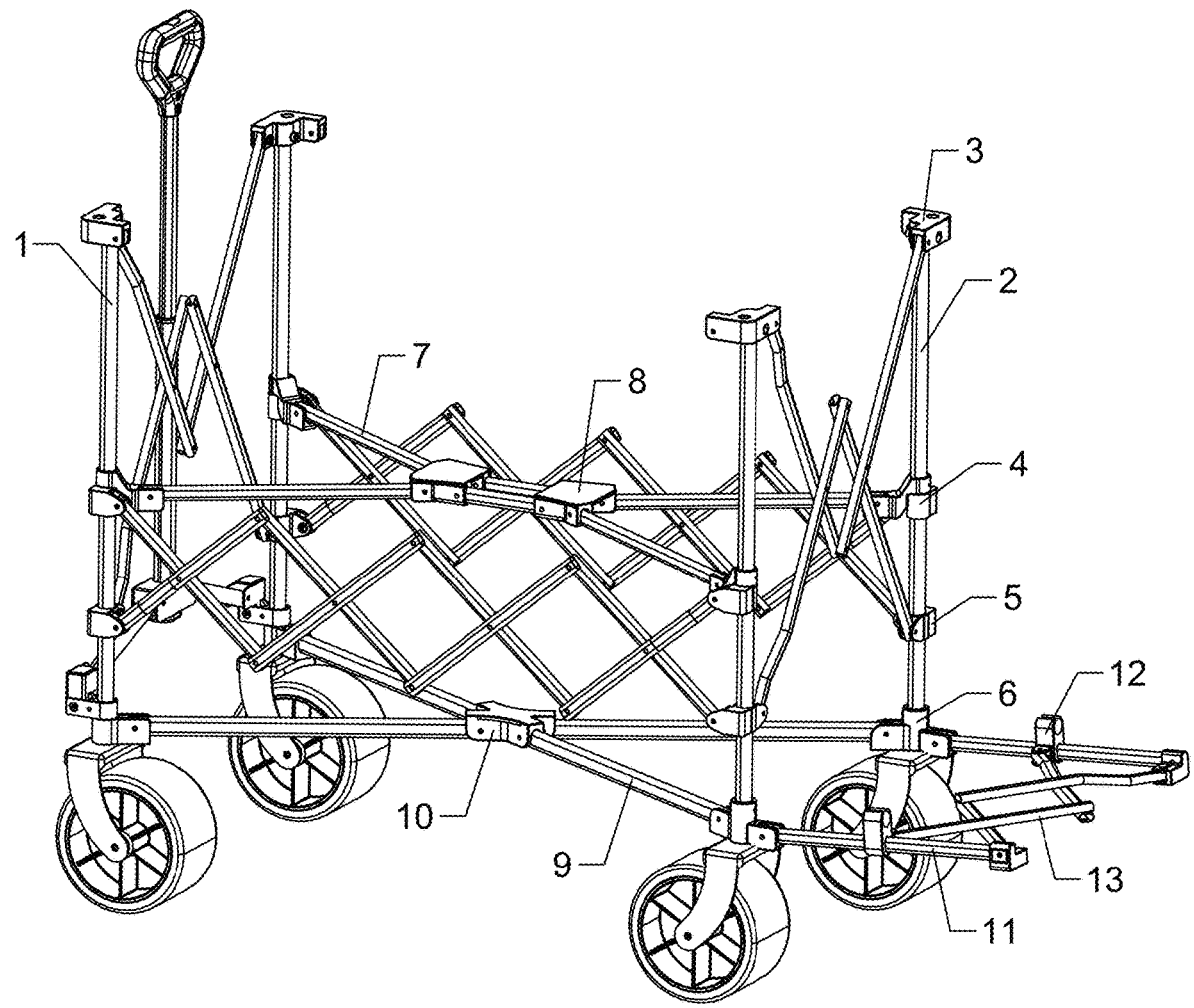
FIG. 1 is a three-dimensional structure diagram of the invention.
Figure 2:
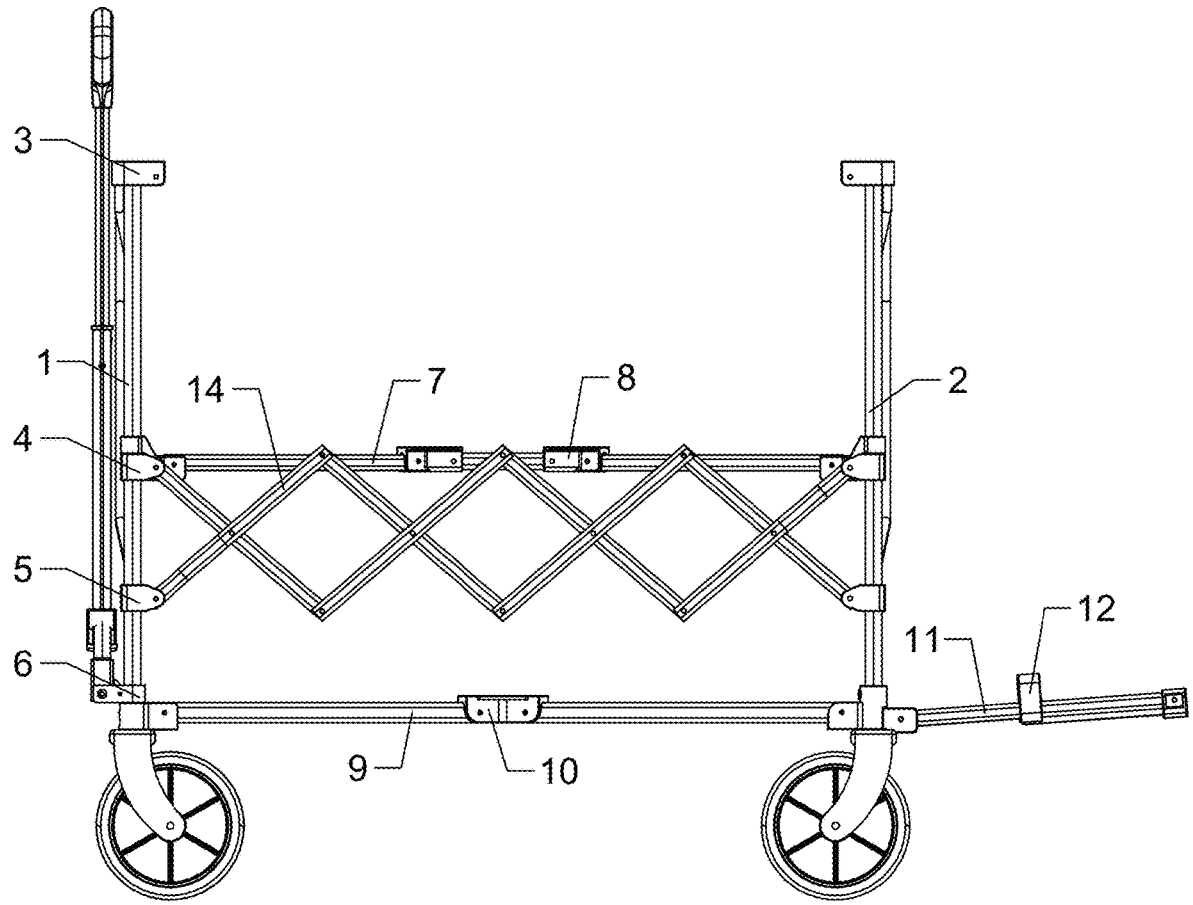
FIG. 2 is a front view of the invention.
Figure 3:
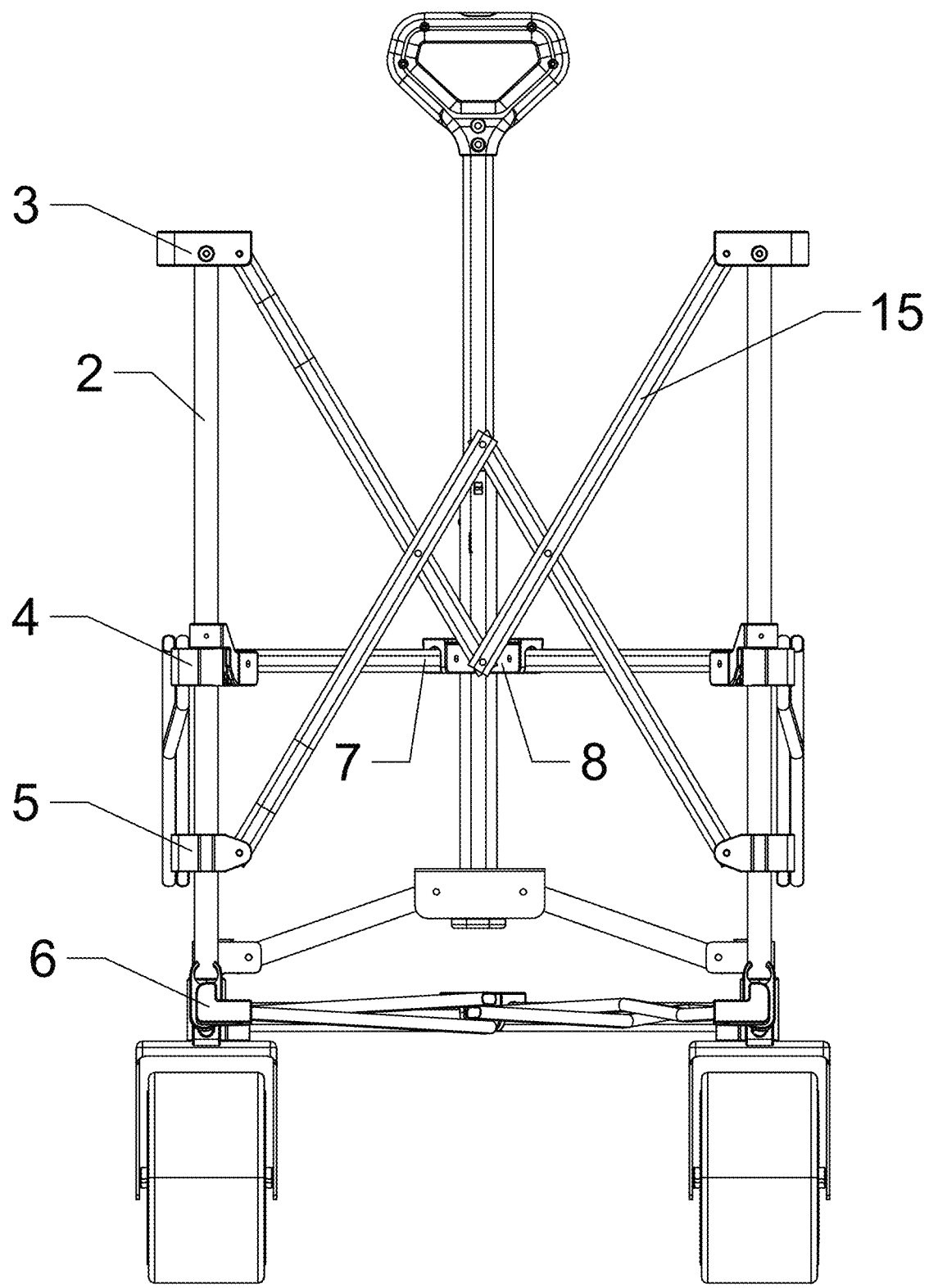
FIG. 3 is a right view of the invention.
Figure 4:
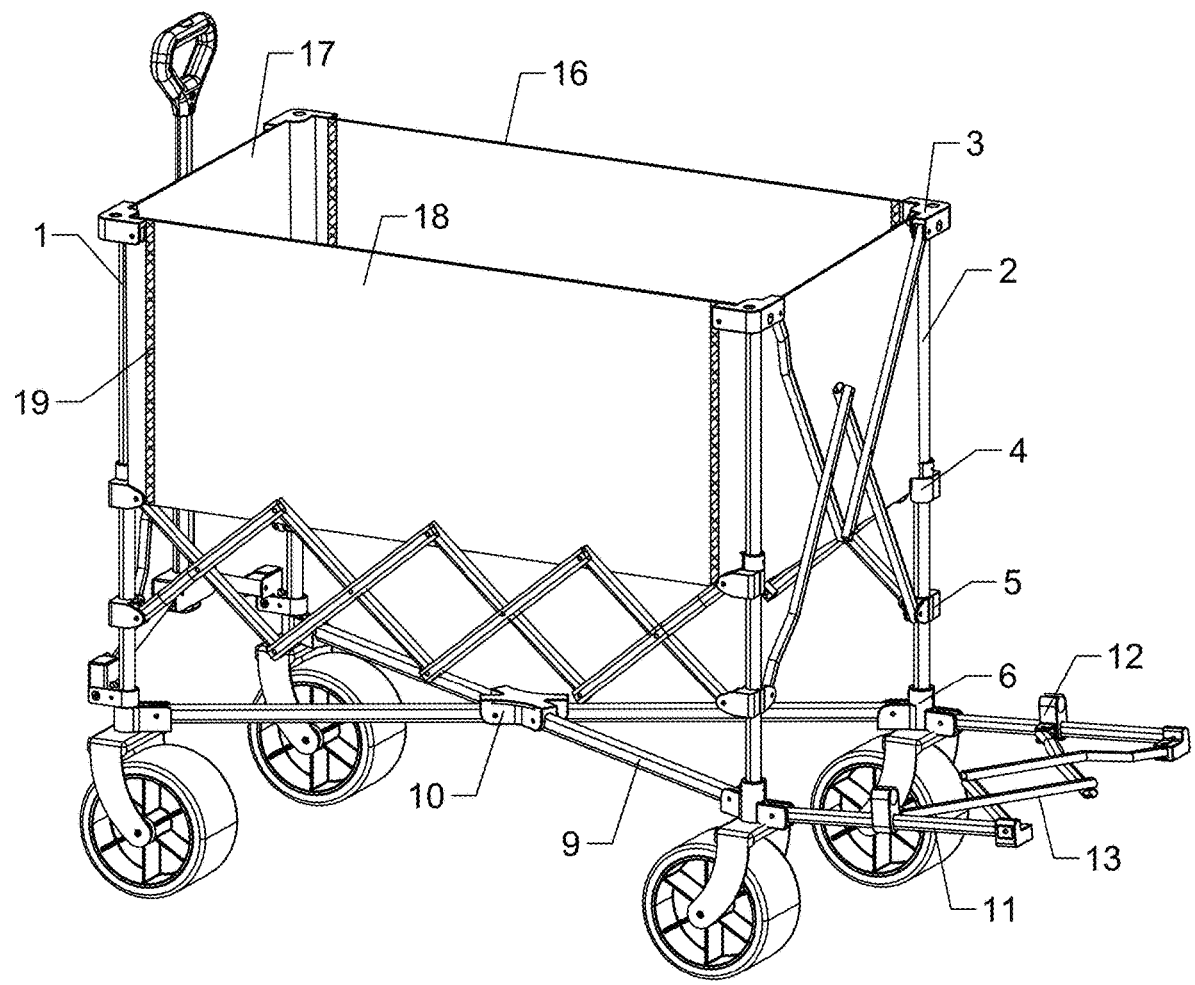
FIG. 4 is a structure diagram of the invention after putting on the cloth pocket.

As shown in the accompanying drawings: 1 front vertical rod; 2 rear vertical rod; 3 top fixing piece; 4 middle fixing piece; 5 sliding piece; 6 bottom fixing piece; 7 first bottom rod; 8 first bottom connecting piece; 9 second bottom rod; 10 second bottom connecting piece; 11 bottom rod; 12 buckle piece; 13 extension folding rod group; 14 left-right folding rod group; 15 front-rear folding rod group; 16 cloth pocket; 17 side pocket; 18 front pocket; 19 zipper.

DESCRIPTION OF EMBODIMENTS

The technical solutions in the embodiments of the invention will be clearly and completely described below in conjunction with the drawings in the embodiments of the invention. Obviously, the described embodiments are only a part of the embodiments of the invention, rather than all the embodiments. All other embodiments obtained by those of ordinary skill in the art based on the embodiments of the invention without creative efforts shall fall within the protection scope of the invention.

Referring to FIG. 1 to FIG. 4, the invention provides a technical solution: a double-deck trailer with a frameless top, including two front vertical rods 1 and two rear vertical rods 2 respectively; each of the front vertical rods 1 and the rear vertical rods 2 is sequentially fixed with a top fixing piece 3, a middle fixing piece 4, a sliding piece 5, and a bottom fixing piece 6 from top to bottom; the top fixing piece 3 and the bottom fixing piece 6 are respectively fixed at a top and bottom of the front vertical rod 1 and the rear vertical rod 2; the middle fixing piece 4 is fixed in a middle of the front vertical rod 1 and the rear vertical rod 2; the sliding piece 5 is located between the middle fixing piece 4 and the bottom fixing piece 6 and slides up and down.

The middle fixing piece 4 is provided with a first bottom rod 7 rotatably connected thereto; four first bottom rods 7 are distributed in an X shape, and a first bottom connecting piece 8 rotatably connected thereto is arranged at an intersection of the first bottom rods 7; a bottom of the front vertical rod 1 and the rear vertical rod 2 is fixed with a bottom fixing piece 6; each bottom fixing piece 6 is provided with a second bottom rod 9 rotatably connected thereto; the second bottom rods 9 are distributed in an X shape, and a second bottom connecting piece 10 rotatably connected thereto is arranged at an intersection of the second bottom rods 9; the space above the first bottom rod 7 and the first bottom connecting piece 8 is an upper carrying space of the trailer, and the space above the second bottom rod 9 and the second bottom connecting piece 10 is a lower carrying space of the trailer. A rectangular area is formed between four top fixing pieces 3 and the middle fixing pieces 4, and a cloth pocket 16 is arranged in the area; the cloth pocket 16 includes side pockets 17 and a front pocket 18; the side pockets 17 are respectively located between two adjacent front vertical rods 1 and two adjacent rear vertical rods 2, and the front pocket 18 is located between the front vertical rods 1 and the rear vertical rods 2; zippers 19 are respectively arranged on both sides of the front pocket 18; after the zippers 19 are pulled down, the front pocket 18 naturally hangs down, and items can pass between the front vertical rods 1 and the rear vertical rods 2. A rectangular support frame is formed by the top fixing pieces 3 and the middle fixing pieces 4 arranged on the front vertical rods 1 and the rear vertical rods 2 for loading the cloth pocket 16; when the zippers 19 are in a fastened state, the side pockets 17 and the front pocket 18 form a closed space with four sides, which is used for placing items with small volume and large quantity; when the zippers 19 are in the opened state, the front pocket 18 naturally hangs down to form an obstacle-free passage, allowing over-wide items to freely pass through and be placed between the front vertical rods 1 and the rear vertical rods 2. By replacing the top fixing rod with the openable and closable cloth pocket 16, the restriction of the rigid structure around the upper deck of the trailer is eliminated, and the transportation demand for over-wide items is realized. Through the operation of the zippers 19, the front pocket 18 can be quickly converted between the carrying mode for items with small volume and large quantity and the carrying mode for over-wide items, adapting to the needs of different scenarios.

A left-right folding rod group 14 is arranged between the front vertical rod 1 and the rear vertical rod 2, and both ends of the left-right folding rod group 14 are respectively rotatably connected with the middle fixing piece 4 and the sliding piece 5. The left-right folding rod group 14 is composed of two symmetrically distributed left-right folding rods intersecting. One of the left-right folding rods is in an M shape and connected between two sliding pieces 5, and the other left-right folding rod is in a W shape and connected between two middle fixing pieces 4; when folding, the M-shaped left-right folding rod pushes the sliding piece 5 to slide downward, driving the W-shaped left-right folding rod to contract toward a center, and the left-right folding rod group 14 automatically folds, reducing the lateral occupied space.

A front-rear folding rod group 15 is arranged between adjacent front vertical rods 1 and the adjacent rear vertical rods 2, and both ends of the front-rear folding rod group 15 are respectively rotatably connected with the top fixing piece 3 and the sliding piece 5. The front-rear folding rod group 15 is composed of two symmetrically distributed front-rear folding rods intersecting. One of the front-rear folding rods is in a V shape and connected between two top fixing pieces 3, and the other front-rear folding rod is in an inverted V shape and connected between two sliding pieces 5; the V-shaped front-rear folding rod and the inverted V-shaped front-rear folding rod intersect to form a symmetric structure; when folding, two front-rear folding rods synchronously rotate around the rotation connection point to achieve compact folding in the front-rear direction.

The bottom fixing piece 6 is provided with a bottom rod 11 rotatably matched therewith; the bottom rod 11 is provided with a buckle piece 12 slidably connected therewith and detachably connected with the rear vertical rod 2; an extension folding rod group 13 is arranged between two bottom rods 11. The extension folding rod group 13 is composed of two symmetrically distributed extension folding rods; one of the extension folding rods is in a V shape and connected to tops of two bottom rods 11, and the other extension folding rod is in an inverted V shape and connected between two buckle pieces 12; through the detachable connection between the buckle piece 12 and the rear vertical rod 2, the quick locking or releasing of the bottom rod 11 is realized, which adapts to the requirements of different unfolding lengths and is convenient for folding and storage.

Figure 5:
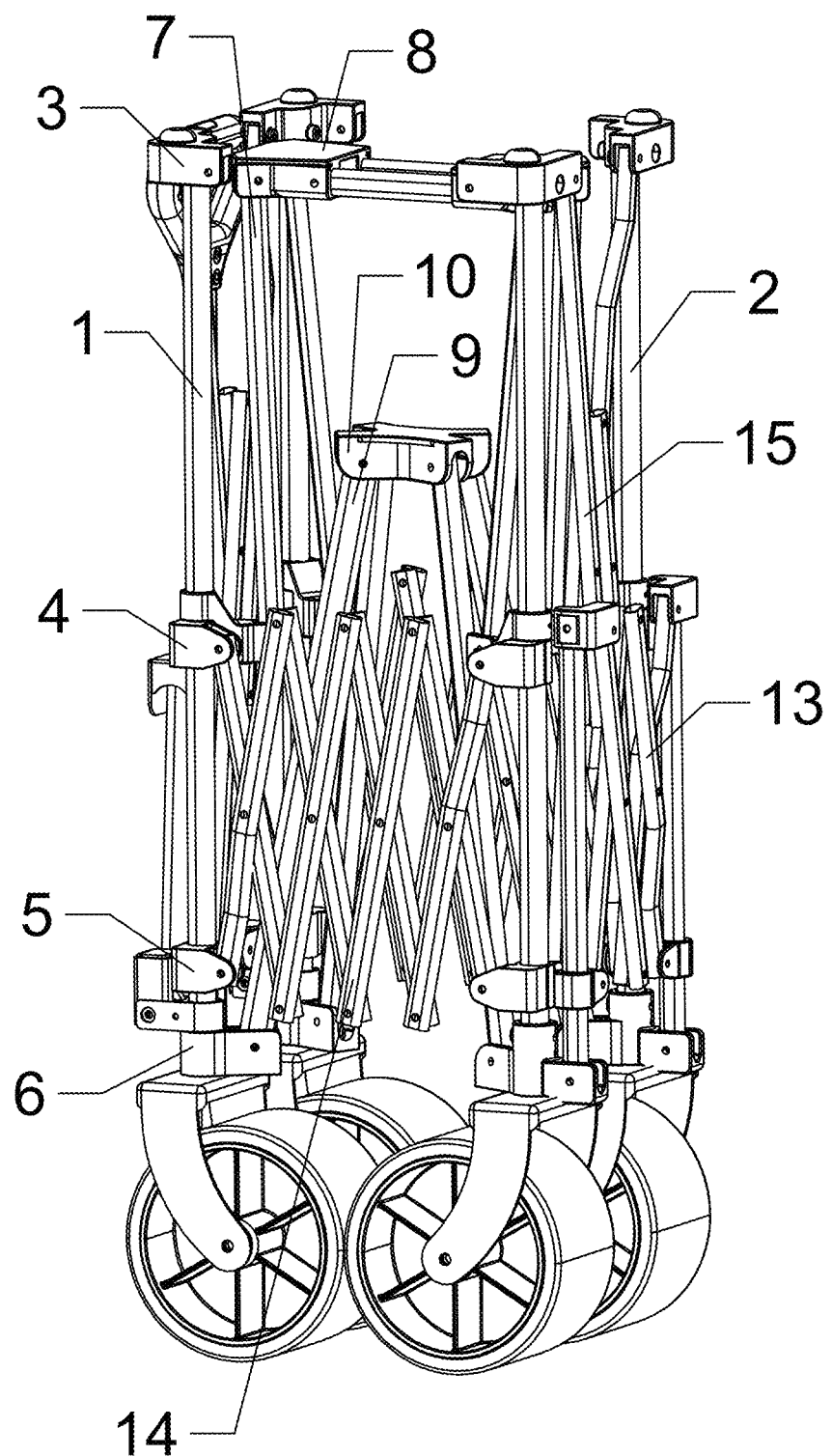
FIG. 5 is a folding structure diagram of the invention.

Referring to FIG. 5, which is the storage principle of the trailer. When storing, lift the first bottom connecting piece 8 and the second bottom connecting piece 10 with both hands at the same time to make the first bottom rod 7 and the second bottom rod 9 store in an inverted cone shape. In this process, the left-right folding rod group 14 and the front-rear folding rod group 15 are close to each other for storage, so that the front vertical rods 1 and the rear vertical rods 2 are gathered, and the extension folding rod group 13 is also close to each other for storage in this process, so that two bottom rods 11 are gathered.

The invention and its embodiments have been described above, but the description is not limited thereto; only one embodiment of the invention is shown in the drawings, and the actual structure is not limited thereto. In general, it is to be understood by those skilled in the art that non-creative design of structural forms and embodiments that are similar to the technical solutions without departing from the spirit of the invention shall all fall within the protective scope of the invention.

What is claimed is:

1. A two-layer trailer, including two front vertical rods and two rear vertical rods respectively; each of the two front vertical rods and the two rear vertical rods is sequentially fixed with four top fixing pieces and middle fixing pieces from top to bottom; a rectangular area is formed between the four top fixing pieces and the middle fixing pieces, and a cloth pocket is arranged in the area; the cloth pocket includes side surfaces and a front side; the side surfaces are respectively located between the two front vertical rods and the two rear vertical rods, and the front side is located between the two front vertical rods and the two rear vertical rods; zippers are respectively arranged on both sides of the front side; after the zippers are pulled down, the front side naturally hangs down, and items can pass between the two front vertical rods and the two rear vertical rods;

wherein the middle fixing pieces are provided with four first bottom rods rotatably connected thereto; the four first bottom rods are distributed in an X shape, and two first bottom connecting pieces rotatably connected to the four first bottom rods are arranged at an intersection of the four first bottom rods;

wherein bottoms of the two front vertical rod and the two rear vertical rod are fixed with bottom fixing pieces; the bottom fixing pieces are provided with four second bottom rods rotatably connected thereto; the four second bottom rods are distributed in an X shape, and a second bottom connecting piece rotatably connected to the four second bottom rods is arranged at an intersection of the four second bottom rods;

wherein the two front vertical rods and the two rear vertical rods are provided with sliding pieces slidably connected thereto; each of the sliding pieces is located between the middle fixing pieces and the bottom fixing pieces; a left-right folding rod group is arranged between the two front vertical rods and the two rear vertical rods, and both ends of the left-right folding rod group are respectively rotatably connected with the middle fixing pieces and the sliding pieces.

2. The two-layer trailer according to claim 1, wherein a bottom of the cloth pocket is erected above the four first bottom rods.

3. The two-layer trailer according to claim 1, wherein the left-right folding rod group is composed of two symmetrically distributed left-right folding rods intersecting; one of the left-right folding rods is in an M shape and connected between the sliding pieces, and the other left-right folding rod is in a W shape and connected between the middle fixing pieces.

4. The two-layer trailer according to claim 1, wherein a front-rear folding rod group is arranged between the two front vertical rods and the two rear vertical rods, and both ends of the front-rear folding rod group are respectively rotatably connected with the four top fixing pieces and the sliding pieces.

5. The two-layer trailer according to claim 4, wherein the front-rear folding rod group is composed of two symmetrically distributed front-rear folding rods intersecting; one of the front-rear folding rods is in a V shape and connected between two of the four top fixing pieces, and the other front-rear folding rod is in an inverted V shape and connected between the sliding pieces.

6. The two-layer trailer according to claim 1, wherein each of the bottom fixing pieces is provided with two bottom rods rotatably matched therewith; each of the two bottom rods is provided with two buckle pieces slidably connected therewith and detachably connected with the two rear vertical rods; an extension folding rod group is arranged between the two bottom rods.

7. The two-layer trailer according to claim 6, wherein the extension folding rod group is composed of two symmetrically distributed extension folding rods; one of the extension folding rods is in a V shape and connected to tops of the two bottom rods, and the other extension folding rod is in an inverted V shape and connected between the two buckle pieces.

\* \* \* \* \*